(12) United States Patent
He et al.

(10) Patent No.: US 9,659,010 B1
(45) Date of Patent: May 23, 2017

(54) MULTIPLE LANGUAGE SCREEN CAPTURE

(71) Applicant: International Business Machines Corporation, Armonk, NY (US)

(72) Inventors: Jenny J. He, Chandler's Ford (GB); Adrian P. Kyte, Broadstone (GB); Joseph R. Winchester, Hursley (GB); Bei Chun Zhou, Beijing (CN); Jun T. Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/979,749

(22) Filed: Dec. 28, 2015

(51) Int. Cl.
*G06F 3/00* (2006.01)
*G06F 17/28* (2006.01)
*G06F 9/44* (2006.01)

(52) U.S. Cl.
CPC ............ *G06F 17/289* (2013.01); *G06F 8/38* (2013.01)

(58) Field of Classification Search
CPC .... G06F 17/28; G06F 17/289; G06F 17/2879; G06F 17/2836
See application file for complete search history.

(56) References Cited

U.S. PATENT DOCUMENTS

| | | | |
|---|---|---|---|
| 4,870,610 A * | 9/1989 | Belfer ................. | G06F 17/2836 434/156 |
| 5,416,903 A * | 5/1995 | Malcolm ............... | G06F 9/4448 704/8 |
| 5,974,372 A | 10/1999 | Barnes et al. | |
| 6,311,151 B1 * | 10/2001 | Yamamoto ............ | G06F 9/4448 704/8 |
| 7,447,624 B2 | 11/2008 | Fuhrmann | |
| 7,490,298 B2 | 2/2009 | Bauman et al. | |
| 7,546,315 B2 * | 6/2009 | Kawada ................. | G06Q 10/10 |
| 7,627,479 B2 * | 12/2009 | Travieso ............... | G06F 17/289 704/2 |
| 8,171,460 B2 * | 5/2012 | Pizzoli .................. | G06F 9/4443 704/2 |
| 8,650,561 B2 | 2/2014 | Gharabally et al. | |
| 8,683,329 B2 * | 3/2014 | Tang ..................... | G06F 17/289 707/706 |
| 2003/0115552 A1 | 6/2003 | Jahnke et al. | |
| 2004/0186857 A1 * | 9/2004 | Serlet ................ | G06F 17/30141 |
| 2006/0143605 A1 | 6/2006 | Cao | |

(Continued)

OTHER PUBLICATIONS

Krause, Felix, "Automatic screenshots for iOS apps", Krausefx.com, Jan. 24, 2013 in Blog, Printed on: Jul. 21, 2015, 1 page, <https://krausefx.com/automatic-screenshots-for-ios-apps/>.

(Continued)

*Primary Examiner* — Dino Kujundzic
(74) *Attorney, Agent, or Firm* — Edward J. Wixted, III

(57) ABSTRACT

In an approach for generating a composite of images in multiple languages when a request is made to capture an image of a screen, a processor receives a request to capture a first graphical user interface (GUI) display of an application in languages available to the application. A processor iterates over GUI elements of the first GUI display to locate language bundle keys. A processor generates a second GUI display for the languages available to the application, wherein the second GUI display is a recreation of original images within the first GUI display.

20 Claims, 2 Drawing Sheets

(56) References Cited

U.S. PATENT DOCUMENTS

| | | | |
|---|---|---|---|
| 2007/0244691 A1 | 10/2007 | Alwan et al. | |
| 2010/0030548 A1* | 2/2010 | Glowacki | G06F 9/4448 704/3 |
| 2010/0107114 A1* | 4/2010 | Zachcial | G06F 17/30867 715/780 |
| 2012/0016655 A1* | 1/2012 | Travieso | G06F 17/2827 704/2 |
| 2012/0290284 A1 | 11/2012 | Aryattawanich et al. | |
| 2015/0149148 A1* | 5/2015 | Ramakrishnan | G06F 17/2872 704/2 |
| 2016/0139914 A1* | 5/2016 | Levi | G06Q 10/00 717/121 |
| 2016/0154789 A1* | 6/2016 | He | G06F 17/2264 715/703 |

OTHER PUBLICATIONS

"A Method for taking snapshot for multiple language web pages", An IP.com Prior Art Database Technical Disclosure, IP.com No. 000223360, IP.com Electronic Publication: Nov. 20, 2012, pp. 1-9.

"SiteShoter v1.42—Take a screenshot of a Web site", NirSoft, Copyright © 2008-2011 Nir Sofer, Printed on: Jul. 21, 2015, 9 pages, <http://www.nirsoft.net/utils/web_site_screenshot.html>.

* cited by examiner

MULTIPLE LANGUAGE SCREEN CAPTURE

BACKGROUND

The present invention relates generally to the field of technical support, and more particularly to generating a composite of images in multiple languages when a request is made to capture an image of a screen.

Technical support refers to a plethora of services by which enterprises provide assistance to users of technology products, such as: mobile phones, televisions, computers, software products, or other electronic or mechanical goods. Generally, technical support services attempt to help the user solve specific problems with a product rather than providing training, customization, or other support services. Technical support may be delivered by email, live support software on a website, or a tool where users can log a call or incident.

Application software (i.e., an application) is a set of computer programs designed to permit a user to perform a group of coordinated functions, tasks, or activities. Application software is dependent on system software to execute. Examples of an application include, but are not limited to: a word processor, a spreadsheet design and management system, a console game, or a library management system.

SUMMARY

Aspects of an embodiment of the present invention disclose a method, computer program product, and computing system for generating a composite of images in multiple languages when a request is made to capture an image of a screen. A processor receives a request to capture a first graphical user interface (GUI) display of an application in languages available to the application. A processor iterates over GUI elements of the first GUI display to locate language bundle keys. A processor generates a second GUI display for the languages available to the application, wherein the second GUI display is a recreation of original images within the first GUI display.

DETAILED DESCRIPTION

Embodiments of the present invention recognize that with the current state of technical support, one of the challenges is viewing a screenshot of an application captured in a language by a user who does not understand the language. An issue arises, for example, when doing support of applications where a piece of software might be written by developers who speak a first language and used by users who speak a second language. Embodiments of the present invention recognize that if an American user captures a screenshot of the graphical user interface (GUI) to email to a support team in China, the support team in China must look at and understand the English GUI, meaning the skill level of the technical support team needs to include being able to read and understand foreign languages for which the application software is written. Embodiments of the present invention detail an approach that can be used to generate a composite of images in multiple languages when a request is made to capture an image of a screen.

Embodiments of the present invention will now be described in detail with reference to the Figures.

Figure 1:
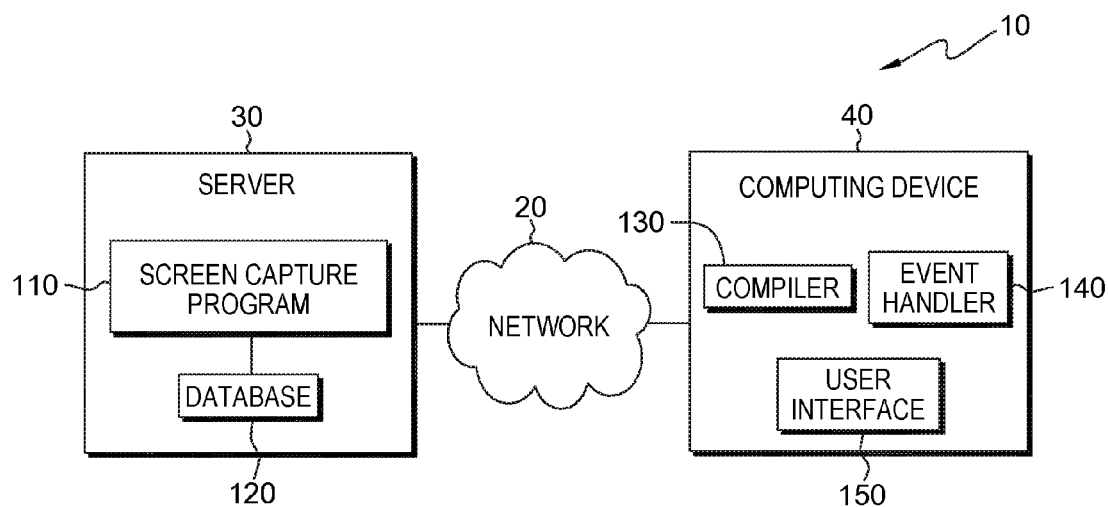
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains screen capture program 110 and database 120. In other embodiments, server 30 may include other components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains compiler 130, event handler 140, and user interface 150. In other embodiments, computing device 40 may include other components, as depicted and described in further detail with respect to FIG. 3.

Screen capture program 110 generates a composite of images in multiple languages when a request is made to capture an image of a screen. In doing so, screen capture program 110 requests the list of available languages that the program is capable of being launched in. Screen capture program 110 iterates over the window controls retrieving the language bundle key for each control. Screen capture program 110 recreates the window for each available language replacing the original strings with the alternative language strings by using the alternative language bundles. In the depicted embodiment, screen capture program 110 resides on server 30. In other embodiments, screen capture program 110 may reside on another server or another computing device, provided that screen capture program 110 can access database 120, compiler 130, event handler 140, and user interface 150.

Database 120 may be a repository that may be written to and/or read by screen capture program 110. In some embodiments, a program, or application, (not shown) may allow an administrator or other user to define the available languages for which an application can run and store the available languages for which the application can run to database 120. In other embodiments, database 120 may store already determined languages for which the application can run. In some embodiments, screen capture program 110 may store files, such as graphics interchange format (GIF) image files, to database 120. In the depicted embodiment, database 120 resides on server 30. In other embodiments, database 120 may reside on another server or another computing device, provided that database 120 is accessible to screen capture program 110.

Compiler 130 may be a computer program, or a set of computer programs, that transforms source code written in a programming language (the source language) into another computer language (the target language), with the latter often having a binary form known as object code. In some embodiments, compiler 130 compiles the source code in such a way that when user visible strings are extracted from bundles and sent to text attributes of controls, the key and name of the bundle are also written to the control. In the depicted embodiment, compiler 130 resides on computing device 40. In other embodiments, compiler 130 may reside on another computing device or another server, provided that compiler 130 is accessible to screen capture program 110.

Event handler 140 may be a callback subroutine that handles inputs received in a program. An event, or message, is a piece of application-level information from the underlying framework, such as the graphical user interface (GUI) toolkit. GUI events include key presses, mouse movements, action selections, and timers expiring. In some embodiments, event handler 140 captures messages written to the GUI while the application is running. In the depicted embodiment, event handler 140 resides on computing device 40. In other embodiments, event handler 140 may reside on another computing device or another server, provided that event handler 140 is accessible to screen capture program 110.

User interface 150 may be any user interface used to access information from server 30, such as information gathered or produced by screen capture program 110. Additionally, user interface 150 may be any user interface used to supply information to server 30, such as information gathered by a user to be used by screen capture program 110. In some embodiments, user interface 150 may be a generic web browser used to retrieve, present, and negotiate information resources from the Internet. In other embodiments, user interface 150 may be a software program or application that enables a user at computing device 40 to access server 30 over network 20. In other embodiments, user interface 150 is a GUI. In the depicted embodiment, user interface 150 resides on computing device 40. In other embodiments, user interface 150, or similar user interfaces, may reside on another computing device or another server, provided that user interface 150 is accessible to screen capture program 110.

Figure 2:
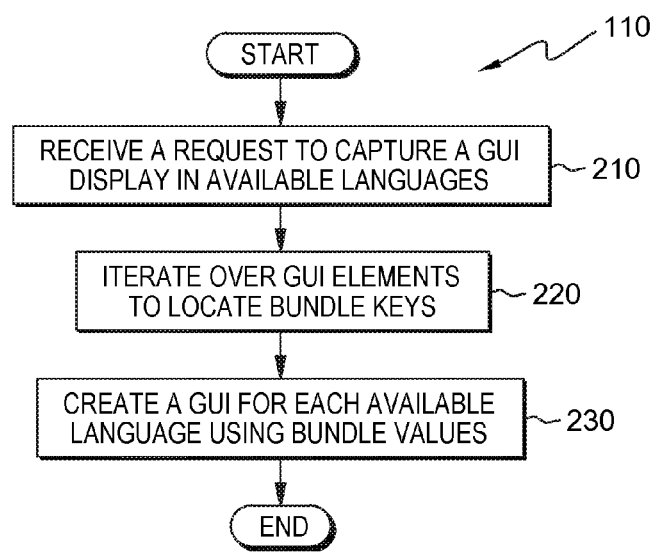
FIG. 2 depicts a flowchart of the steps of a screen capture program, executing within the computing system of FIG. 1, for generating a composite of images in multiple languages when a request is made to capture an image of a screen, in accordance with an embodiment of the present invention.

FIG. 2 depicts a flowchart of the steps of a screen capture program, executing within the computing system of FIG. 1, in accordance with an embodiment of the present invention. Screen capture program 110 generates a composite of images in multiple languages when a request is made to capture an image of a screen.

Initially, user interface 150 allows a user, or programmer, to write code for a program or application.

In step 210, screen capture program 110 receives a request to capture a GUI display in available languages for a particular application. In one embodiment, screen capture program 110 receives the request to capture a GUI display in available languages when a user clicks a "print screen" button. In other embodiments, screen capture program 110 receives the request to capture a GUI display in available languages by any available process that allows a user to copy an entire screen.

When the program source code is compiled, the language bundle keys and name are added to the window controls. In one embodiment, compiler 130 compiles the source code in such a way that when user visible strings are extracted from bundles (e.g., language bundles) and sent to text attributes of controls, the key and name of the bundle are also written to the control. The embodiment provides a mapping between the original bundle location of the string and the key used to extract the user visible portion.

In a language such as Java®, string translation occurs by having the value of the control dynamically looked up in a file containing a key value. Java and all Java-based trademarks and logos are trademarks or registered trademarks of Oracle and/or its affiliates. An example is where the single language version of:
Button b=new Button( );
b.setText("OK");
is written as:
Button b=new Button( );
b.setMessage(Messages.getMessage("guiclass.wizard.create.file","KEY_1")).

At runtime, the value of KEY_1 is retrieved from a language bundle, such as guiclass.wizard.create.file in English or guiclass.wizard.create.file.FR in French and used as the message for the control. Screen capture program 110 needs to know the name of the bundle and the key, however, and this is done by a programmer inserting lines before the .setmessage line that stores these two values. In one embodiment, a precompiler (not shown) is used to insert the statements in the program. In other embodiments, similar pre-processor techniques are used to analyze the source looking for the Messages.getMessage(parm1,parm2) notation and insert the following additional instructions:
Button b=new Button( );
b.setUserData("BUNDLENAME","guiclass.wizard.create.file");
b.setUserData("BUNDLEKEY","KEY_1");
b.setMessage(Messages.getMessage("guiclass.wizard.create.file","KEY_1")).

In step 220, screen capture program 110 iterates over GUI elements to locate bundle keys, namely, language bundle keys. In doing so, screen capture program 110 analyzes the GUI. In some embodiments, in analyzing the GUI, screen capture program 110 receives elements, such as, events and messages. An event, or message, is a piece of application-level information from the underlying framework, such as the graphical user interface (GUI) toolkit. GUI events include key presses, mouse movements, action selections, and timers expiring. In one embodiment, via event handler 140, screen capture program 110 captures messages written to the GUI while the application is running. When a request is made to capture the GUI, or screen, screen capture program 110 knows which windows are being displayed.

In some embodiments, there is a create event for each window created by the application, such as a WM_CREATE on Windows®, and controls created and attributes set are sent to screen capture program 110 via the display. When a window is closed, there is a WM_CLOSE event on Windows®. Hence, at any point in time, screen capture program 110, via event handler 140, knows which windows are active and visible and which controls it contains and the attributes of each.

In step 230, screen capture program 110 creates a GUI for each available language using bundle values. In doing so, screen capture program 110 recreates the original displays. In one embodiment, screen capture program 110 recreates the original displays on an abstract non-visible area, reconstructing the controls and setting the attributes to build clones of the original, or primary, display. In doing so, screen capture program 110 creates a side display, or GUI, for each available language, using the language strings from the bundles supplied with the application. The secondary display would be a mirror replica of the primary display in terms of how the GUI looks.

In some embodiments, via event handler 140, instead of retrieving the value of the user visible strings of each control on the original display, screen capture program 110 retrieves the bundle name and key used by the application and retrieves the key from a different language bundle. For example, screen capture program 110 looks to see if the UserData values of BUNDLENAME and BUNDLEKEY have been set. If the values have been set, screen capture program 110 retrieves the key value from the language bundle for the intended output language and uses the retrieved value instead of the original key value for the original language. In one embodiment, the end result is that the alternative GUI displays are recreations of the original displays, entirely, but with substituted strings from the application's original alternative language bundles. Screen capture program 110 captures the graphics context of each side GUI and stores them as frames in a file, such as a graphics interchange format (GIF) file.

Figure 3:
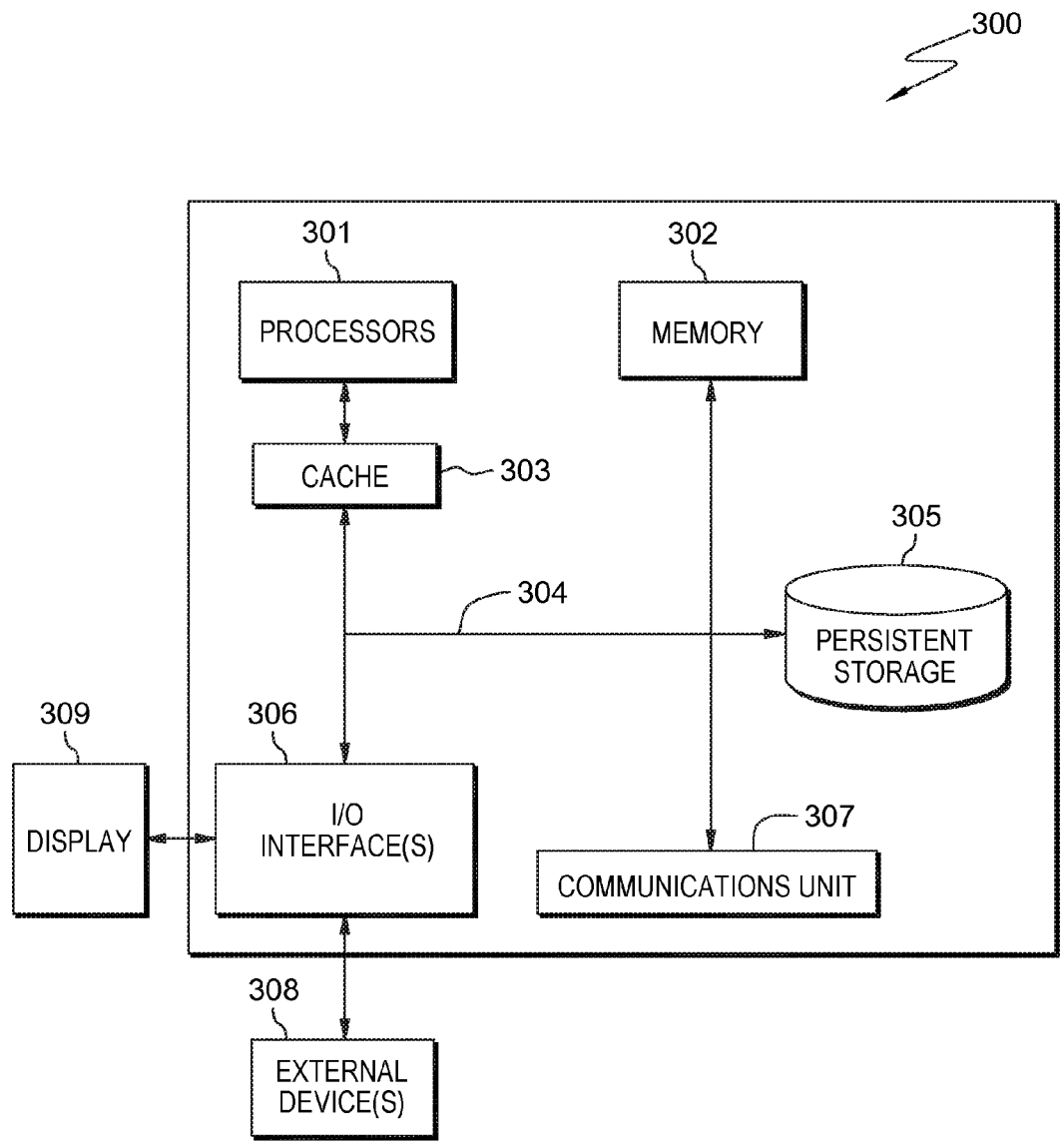
FIG. 3 depicts a block diagram of components of the server and/or the computing device of FIG. 1, in accordance with an embodiment of the present invention.

FIG. 3 depicts computer system 300, which is an example of a system, such as server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Screen capture program 110 and database 120 may be downloaded to persistent storage 305 of server 30 through communications unit 307 of server 30. Compiler 130, event handler 140, and user interface 150 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., screen capture program 110 and database 120, can be stored on such portable computer readable storage media and can be loaded onto persistent storage 305 of server 30 via I/O interface(s) 306 of server 30. Software and data used to practice embodiments of the present invention, e.g., compiler 130, event handler 140, and user interface 150, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a composite of images in multiple languages when a request is made to capture an image of a screen, the method comprising:

receiving, by one or more processors, a request to capture a first graphical user interface (GUI) display of an application in a first language available to the application;

iterating, by one or more processors, over GUI elements of the first GUI display to locate bundle keys from a first language bundle for a second language; and generating, by one or more processors, a second GUI display for the first language available to the application, wherein the second GUI display is a recreation of images within the first GUI display, and wherein generating the second GUI comprises:

retrieving, by one or more processors, a bundle name and a first bundle key from the first language bundle for the second language and a second bundle key from a second language bundle for the first language; and running, by one or more processors, the application a second time, using the second bundle key from the second language bundle for the first language in place of the first bundle key from the first language bundle for the second language.

2. The method of claim 1, further comprising:

retrieving, by one or more processors, compiled source code, wherein the compiled source code is compiled such that when user visible strings are extracted from a bundle and sent to text attributes of controls, a key and a name of the bundle are also written to the controls, providing a mapping between the bundle location of the string and the key used to extract the user visible strings.

3. The method of claim 2, wherein alternative strings from the second language bundle are embedded in the compiled source code.

4. The method of claim 1, wherein generating the second GUI display comprises:

generating, by one or more processors, alternative GUI displays with different languages, using substituted language strings from the second language bundle.

5. The method of claim 1, further comprising:

capturing, by one or more processors, messages written to the first GUI, wherein the messages include key presses, mouse movements, action selections, and timers expiring.

6. The method of claim 4, wherein the alternative GUI displays are recreated on a non-visible area by reconstructing controls and setting the controls' attributes to build clones of the first GUI display, and wherein the non-visible area is a side, off-screen display.

7. The method of claim 6, wherein graphics context of the side, off-screen displays are captured and stored as frames in a graphics interchange format (GIF) file.

8. A computer program product for generating a composite of images in multiple languages when a request is made to capture an image of a screen, the computer program product comprising:

one or more computer readable storage media and program instructions stored on the one or more computer readable storage media, the program instructions comprising:

program instructions to receive a request to capture a first graphical user interface (GUI) display of an application in a first language available to the application;

program instructions to iterate over GUI elements of the first GUI display to locate bundle keys from a first language bundle for a second language; and program instructions to generate a second GUI display for the first language available to the application, wherein the second GUI display is a recreation of images within the first GUI display, and wherein generating the second GUI comprises:

program instructions to retrieve a bundle name and a first bundle key from the first language bundle for the second language and a second bundle key from a second language bundle for the first language; and program instructions to run the application a second time, using the second bundle key from the second language bundle for the first language in place of the first bundle key from the first language bundle for the second language.

9. The computer program product of claim 8, further comprising:

program instructions, stored on the one or more computer readable storage media, to retrieve compiled source code, wherein the compiled source code is compiled such that when user visible strings are extracted from a bundle and sent to text attributes of controls, a key and a name of the bundle are also written to the controls, providing a mapping between the bundle location of the string and the key used to extract the user visible strings.

10. The computer program product of claim 9, wherein alternative strings from the second language bundle are embedded in the compiled source code.

11. The computer program product of claim 8, wherein program instructions to generate the second GUI display comprise:

program instructions to generate alternative GUI displays with different languages, using substituted language strings from the second language bundle.

12. The computer program product of claim 8, further comprising:

program instructions, stored on the one or more computer readable storage media, to capture messages written to the first GUI, wherein the messages include key presses, mouse movements, action selections, and timers expiring.

13. The computer program product of claim 11, wherein the alternative GUI displays are recreated on a non-visible area by reconstructing controls and setting the controls' attributes to build clones of the first GUI display, and wherein the non-visible area is a side, off-screen display.

14. The computer program product of claim 13, wherein graphics context of the side, off-screen displays are captured and stored as frames in a graphics interchange format (GIF) file.

15. A computer system for generating a composite of images in multiple languages when a request is made to capture an image of a screen, the computer system comprising:

one or more computer processors, one or more computer readable storage media, and program instructions stored on the computer readable storage media for execution by at least one of the one or more processors, the program instructions comprising:

program instructions to receive a request to capture a first graphical user interface (GUI) display of an application in a first language available to the application;

program instructions to iterate over GUI elements of the first GUI display to locate bundle keys from a first language bundle for a second language; and program instructions to generate a second GUI display for the first language available to the application, wherein the second GUI display is a recreation of images within the first GUI display, and wherein generating the second GUI comprises:
 program instructions to retrieve a bundle name and a first bundle key from the first language bundle for the second language and a second bundle key from a second language bundle for the first language; and
 program instructions to run the application a second time, using the second bundle key from the second language bundle for the first language in place of the first bundle key from the first language bundle for the second language.

16. The computer system of claim 15, further comprising:
 program instructions, stored on the computer readable storage media for execution by at least one of the one or more processors, to retrieve compiled source code, wherein the compiled source code is compiled such that when user visible strings are extracted from a bundle and sent to text attributes of controls, a key and a name of the bundle are also written to the controls, providing a mapping between the bundle location of the string and the key used to extract the user visible strings.

17. The computer system of claim 16, wherein alternative strings from the second language bundle are embedded in the compiled source code.

18. The computer system of claim 15, wherein program instructions to generate the second GUI display comprise:
 program instructions to generate alternative GUI displays with different languages, using substituted language strings from the second language bundle.

19. The computer system of claim 15, further comprising:
 program instructions, stored on the computer readable storage media for execution by at least one of the one or more processors, to capture messages written to the first GUI, wherein the messages include key presses, mouse movements, action selections, and timers expiring.

20. The computer system of claim 18, wherein the alternative GUI displays are recreated on a non-visible area by reconstructing controls and setting the controls' attributes to build clones of the first GUI display, and wherein the non-visible area is a side, off-screen display.

\* \* \* \* \*